Sept. 29, 1970  HANS-CHRISTOF KLEIN ET AL  3,531,767
DUAL-COMPARTMENT MASTER CYLINDER LIQUID-LEVEL INDICATOR
Filed Oct. 26, 1967  2 Sheets-Sheet 1

Hans-Christof Klein
Gert Schrader
INVENTORS.

BY

Karl F. Ross
Attorney

# United States Patent Office 3,531,767
Patented Sept. 29, 1970

3,531,767
DUAL-COMPARTMENT MASTER CYLINDER LIQUID-LEVEL INDICATOR
Hans-Christof Klein, Hattersheim am Main, and Gert Schrader, Walldorf, Hessen, Germany, assignors to Alfred Teves G.m.b.H., Frankfurt am Main, Germany, a corporation of Germany
Filed Oct. 26, 1967, Ser. No. 678,302
Claims priority, application Germany, Nov. 5, 1966, T 32,453
Int. Cl. B60q 1/00
U.S. Cl. 340—52
10 Claims

ABSTRACT OF THE DISCLOSURE

A dual-compartment receptacle, especially a master-cylinder reservoir for the tandem master-cylinder assembly of a vehicular-brake system with dual fluid-transmission network, having a level-indicating assembly with a pair of floats in the respective compartments having arms swingably mounted on a common shaft and provided with cam extensions acting upon a common force-transmission plate attached to a rod extending from the receptacle and cooperating with contacts to provide an indication to the operator of the vehicle of liquid-level drop in either compartment.

---

Our present invention relates to a liquid-level indicating assembly for dual-compartment receptacles responsive to the fall in the liquid level in either compartment to provide a signal thereof.

The use of liquid-level indicators to provide, at remote locations, a visual or acoustical warning signal of a fall in the level of a liquid compartment has been proposed heretofore. In general, indicators when provided with a float resting in the liquid, can be classified in two general types. In the first of these types, the float consists of a thin-walled hollow body which cooperates directly with electrical contacts in the receptacle to control a warning circuit providing a visual or acoustic indication of the fall in the liquid level beyond a predetermined degree or to a predetermined point. Such systems have the disadvantage that the electrical contacts are immersed in the fluid and a galvanic or electrolytic action takes place which eventually erodes the material constituting the float and causes leakage thereof and/or electrolytic contamination of the fluid. Since the float has relatively thin walls, leakage of the liquid into the float occurs and the unit no longer responds to changes in level.

In the second type of level-indicating device, the float is provided with a pin or rod which extends from the receptacle and is provided or cooperates with contact means externally of the receptacle chamber. While this system avoids galvanic deterioration of the float, it is not practical for dual-compartment receptacles of the type used in automotive-vehicle brake systems.

Thus, it has become a common practice of late to provide vehicle brakes of the dual-network type in which a two-chamber master cylinder of tandem or parallel construction is surmounted by a reservoir in the form of one or more receptacles defining two independent compartments for the brake fluid. Each of these compartments feeds a respective master-cylinder chamber which, in turn, delivers brake fluid to a respective transmission net communicating with a respective set of wheel brakes. In the several manifestations, each transmission net communicates with the wheel brakes of either the front or rear wheels, with one front wheel and the diagonally opposite rear wheel brake, or with one brake cylinder of each of the front and rear wheel brakes. In all cases, the brake fluids in the separate compartments of the receptacle means remain independent from one another so that, in the event of failure in one or the other brake-fluid networks, the sudden drop in level in the corresponding receptacle compartment will not detrementally affect the operation of the other set of wheel-brake cylinders. The use of level indicators in such assembly has the disadvantage that separate indicators are required for each receptacle compartment at double expense and inconvenience in mounting and construction.

It is, therefore, the principal object of the present invention to provide an improved indicating system whereby the abovementioned disadvantages are avoided.

A more specific object of our invention is to provide a level-indicating unit, especially adapted to dual-network vehicular-brake systems which is of relatively low cost and simple construction but is responsive to the fall of the liquid level in either master-cylinder reservoir compartment without creating galvanic and electrolytic-deterioration problems.

We have found that these objects can be conveniently and effectively attained when, in a receptacle means comprising a pair of liquid compartments subject to change in liquid level, a pair of floats is provided, one of the floats being disposed in each compartment and resting upon the liquid therein, the floats each having respective arms extending away from the surface of the liquid and pivotally mounted upon a common shaft above the liquid level and preferably in the vertical median plane between the compartments. Each of the arms is provided, proximal to this shaft, with a respective camming member angularly adjoining the arms at the pivot shaft and bearing upon a horizontal pressure place overlying the shaft; the plate is vertically shiftable in the receptacle means. The latter may consist of a single receptacle structure subdivided internally by a partition extending upwardly from the base of the receptacle to a point below the shaft but above the normal liquid level. The pressure plate is mounted on an upstanding rod vertically shiftable in the receptacle and extending out of the compartment and provided externally thereof with means for operating contacts connected in an electrical warning. When the device constitutes part of a vehicular brake system, the contacts are connected in a warning circuit having acoustical or optical warning means at the dashboard of the vehicle for notifying the driver of the fall of the liquid level in either compartment below a predetermined point. Advantageously, the rod passes through a partition separating the liquid-containing compartment from a chamber in which the contacts are provided.

Still another feature of this invention resides in the provision of the contact assembly within a cover or cap removably mounted upon the receptacle and detachable therefrom to permit filling of the receptacle with brake fluid.

It will thus be evident that, although a pair of floats are provided to function independently, they cooperate via the pressure plate and rod with a single set of contacts and that increased simplicity has been obtained without interfering with the independence of the liquid within the respective compartments. The cover of the receptacle can be composed of an electrically insulating material in which the contact means is mounted (e.g. by embedding in moldable material of the cover) whereupon the rod may carry at least one contact for cooperating with a contact mounted in the cover and projecting into the path of the first contact.

The above and other objects, features and advantages will become more readily apparent from the following description, reference being made to the accompanying drawing in which.

Figure 1:
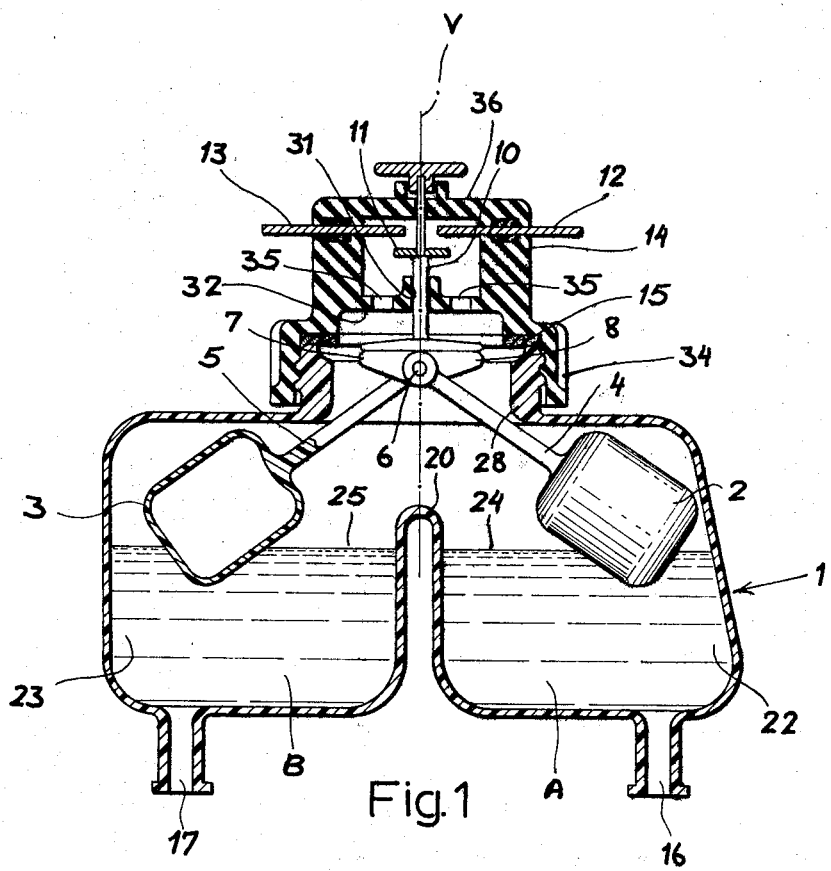
FIG. 1 is a vertical cross-sectional view through a brake-fluid reservoir of the dual-network type provided with the indicating system of this invention.
Figure 2:
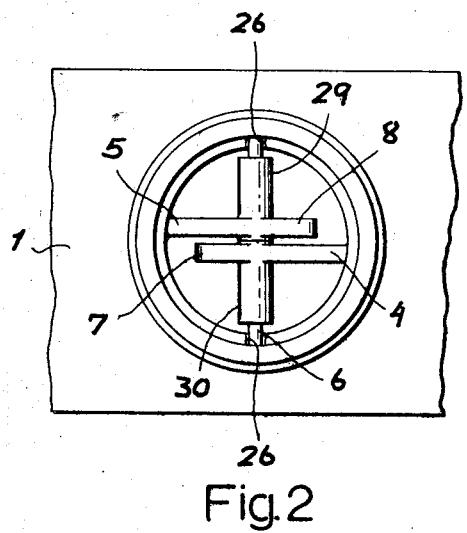
FIG. 2 is a plan view of the indicating system mounted in the receptacle, showing the cover removed.
Figure 3:
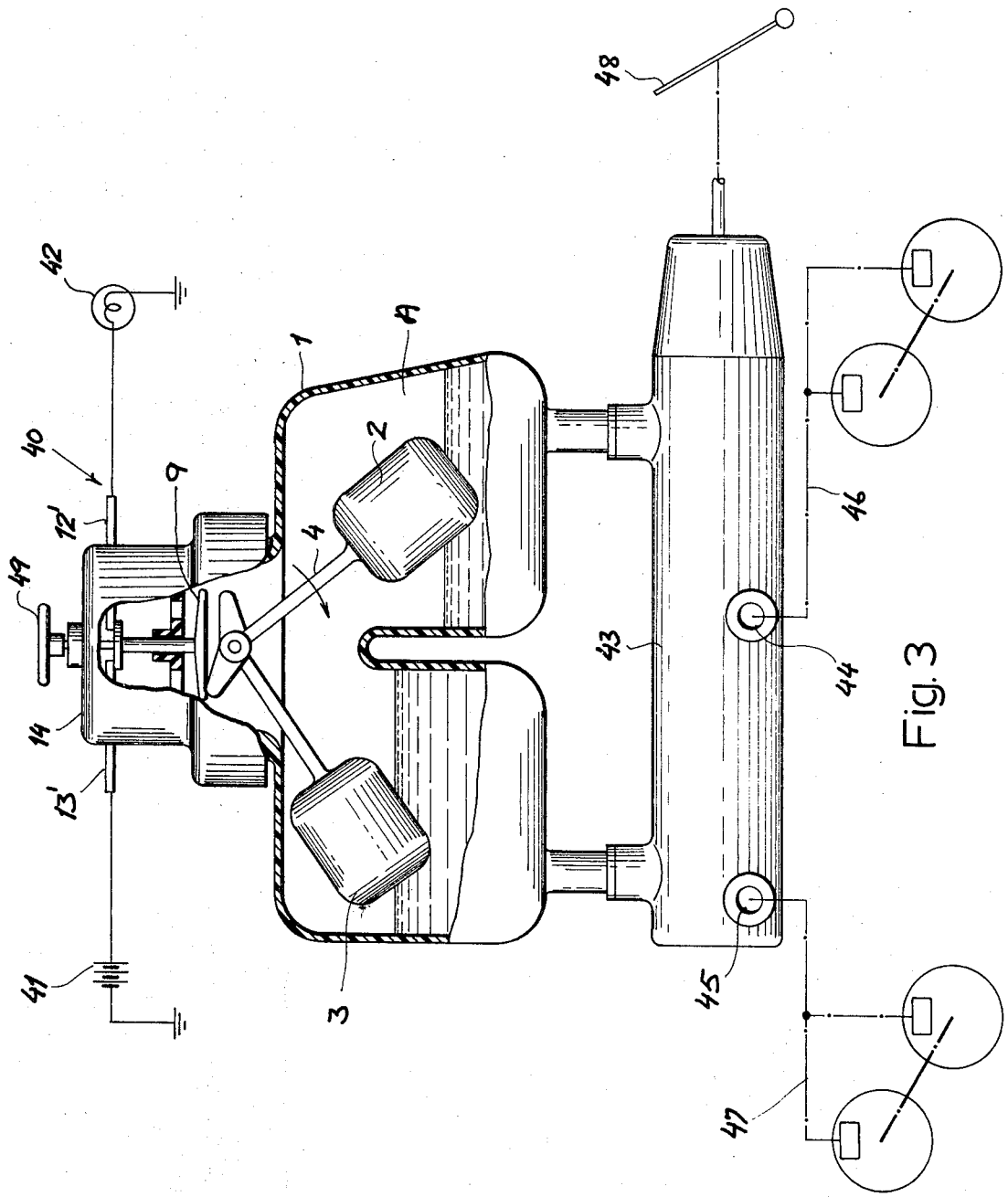
FIG. 3 is a view similar to FIG. 1 of the overall brake system showing the fall of the level in one of the compartments.

In FIGS. 1 through 3 of the drawing, we show a receptacle generally designated at 1 and blow-molded unitarily from synthetic resin to form a pair of compartments A and B separated by a partition 20 rising from the base of the container and lying generally in a vertical median plane V thereof. Each of the compartments A and B contains a respective body of liquid 22 and 23 supporting a respective float 2 or 3. The floats 2 or 3 are molded from synthetic resin integrally with respective arms 4 and 5 which rise from the surface 24 or 25 of the respective bodies of liquid 22 and 23 and converge upward toward the median plane V. Above the partition 20, we provide a horizontal shaft 6 which lies in the plane V and rests in upper of notches 26 at diametrically opposite sides of the mouth 27 of the receptacle 1 which merges with this mouth via a neck 28.

The arms 4 and 5 respectively carry camming extensions 7 and 8 which are angularly offset from the respective arms at the pivotal axis defined by the shaft 6. At the junction between extension 7 and arm 4 and between extension 8 and arm 5, hubs 29 and 30 are provided to independently journal the floats upon the common shaft 6. The camming extensions 7 and 8, whose upper surfaces lie in a common horizontal plane when the levels of the surfaces 24 and 25 in the compartments A and B are identical, bear upon the underside of a circular pressure plate 9 which carries an upstanding rod 10 vertically guided in a boss 31 molded into a partition 32 separating a chamber 33 in the cap 14 from the compartments A and B.

The cap 14 is molded from electrically insulating material, e.g. hard rubber, and has an apron 34 which is internally threaded to mate with the externally threaded neck 28 of the receptacle 1. A sealing ring 15 is clamped between the neck 28 and the cover 14 while openings 35 are provided in the partition 32 to prevent compression of air in compartment 33 and to vent the compartments A and B to the atmosphere. The rod 10 also extends through the upper wall 36 of the cover which forms a second guide.

The rod 10 is provided with a contact ring 11 which is vertically shiftable on the rod and is designed to connect electrically a pair of contact springs 12 and 13 extending diametrically into the compartment 33 and the path of the ring 11; the contacts are embedded in the cap electrically insulating. The contacts 12 and 13 are, as illustrated in FIG. 3, connected in an electric circuit 40 comprising the ignition battery 41 of an automotive vehicle. One side of this battery is connected to ground while the other side is tied to the terminal 13' of the contact spring 13 emerging from the cap 14. To complete the cricuit, the other terminal 12' is connected to one side of a lamp 42 mounted on the dashboard of the vehicle, the other side of the lamp being grounded.

As has been diagrammatically illustrated in FIG. 3, the receptacle 1 is mounted upon a tandem master cylinder 43 having outlets at 44 and 45 for the front and rear wheel brake networks 46 and 47, respectively, the master cylinder being operated in the usual manner by the brake pedal 48.

As can be seen in FIG. 3, leakage in one of the brake networks (network 46) may cause a lowering of the liquid in the respective chamber (e.g. chamber A) with a corresponding rotation of the float 2 and its arm 4 in the clockwise sense to cam the plate 9 upwardly and close the connection between terminals 12' and 13', thereby illuminating lamp 42 and warning the driver of the vehicle that a fluid deficiency exists. From the position of the floats 2 and 3 in FIG. 3 it is evident that only the float associated with the lowermost liquid level will affect the pressure plate 9 and the rod 10. A knob 49 at the outward end of the rod 10 forms a stop which prevents the rod 10 from slipping out of the cap 14 when the latter is unscrewed and removed with the rod 10, the base 9 and the contact assembly to permit brake fluid to be added. Lifting of knob 49 serves to test the contacts. When necessary, the float assembly 2, 3 can be lifted with the shaft 6 out of the notches 26, although, by normal refilling, only the cap is detached. Tubular fittings 16 and 17 at the base of the chambers A and B serve to connect them to the respective chambers of the master cylinder.

The invention described and illustrated is believed to admit of many modifications within the ability of persons skilled in the art, all such modifications being considered within the spirit and scope of the appended claims.

We claim:

1. The combination, with receptacle means having a pair of liquid-containing compartments subject to independent change in liquid level, of indicating means comprising a respective float in each of said compartments resting upon the liquid therein, respective arms affixed to said float and extending away from the liquid surface therein, common pivot means swingably mounting said arms for rotation about a common axis above the liquid in said compartment, each of said arms being formed with camming portions proximal to said pivot means, a common pressure plate overlying said camming portions and engageable thereby for displacement upon individual swinging movement of said arms as said floats independently follow the level of the lquid in the respective compartments, and a rod carried by said plate and extending away from said compartments for indicating the fall in liquid level in at least one of said compartments.

2. The combination defined in claim 1, further comprising contact means externally of said compartments operable by said rod for signaling the fall of the liquid level in either compartment below a predetermined point.

3. The combination defined in claim 2 wherein said receptacle means is provided with removable cap, said contact means, said rod and said plate being mounted in said cap for removal therewith from said receptacle means.

4. The combination defined in claim 3 wherein said cap is provided with a chamber separated from said compartment by a partition, said contact means being provided in said chamber, said rod being slidably guided in said partition.

5. The combination defined in claim 3 wherein said contact means includes at least one contact carried by said rod and at least one further contact mounted in said cap in the path of the contact carried by said rod upon movement of said rod in response to the action of said floats.

6. The combination defined in claim 5 wherein said cap is formed of an electrically insulating material and has a pair of contacts embedded therein, said rod carrying a conductive member producing the contact embedded in said cap upon movement of said rod.

7. The combination defined in claim 3 wherein said cap and said receptacle means are provided with cooperating screw-type formations threadedly mounting said cap on said receptacle means.

8. The combination defined in claim 3 wherein said receptacle means is a unitary fluid reservoir provided with a partition subdividing the interior of said reservoir into said compartment, said pivot means including a shaft mounted in said reservoir above said partition.

9. The combination defined in claim 8, further comprising a tandem master cylinder communicating with said reservoir for operating respective sets of wheel brakes with the fluid from said compartments, and circuit means including said contact means for providing a warning signal to the driver of the vehicle.

10. The combination defined in claim 9 wherein said vehicle has a dashboard provided with a lamp energized by said circuit means.

References Cited
UNITED STATES PATENTS

| | | | |
|---|---|---|---|
| 2,433,968 | 1/1948 | Wiseley | 200—84 XR |
| 2,855,479 | 10/1958 | Motta | 200—84 |

ALVIN H. WARING, Primary Examiner

U.S. Cl. X.R.

73—308; 200—84; 340—244